3,284,337
METHOD OF REMOVING PHENOLIC COMPOUNDS FROM WASTE WATER

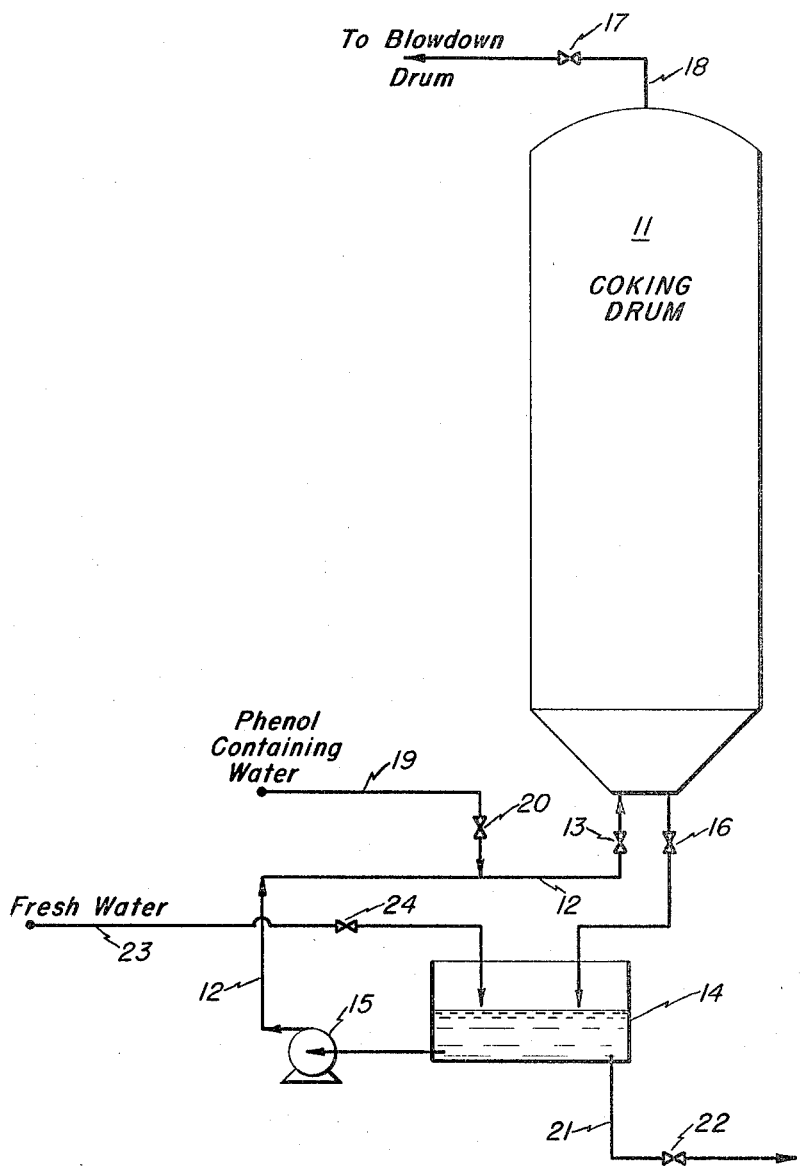

Gene Stoneburner, Williamsburg, Va., assignor to Standard Oil Company, Chicago, Ill., a corporation of Indiana
Filed May 22, 1961, Ser. No. 111,750
3 Claims. (Cl. 208—46)

This invention relates to a method for removing phenolic compounds from waste waters which become contaminated in petroleum refining operations. More particularly it relates to a method for removing phenol from waste waters used in a fluid catalytic cracking process.

In the fluid catalytic cracking process oxygenated compounds such as phenolic compounds are produced as byproducts to the main cracking reaction. In some fluid catalytic cracking operations water is used as a quench and water also enters the process in form of steam, which is condensed. Due to the solubility of the phenolic compounds in water these quench and condensate waters collect phenols and other phenolic compounds produced as a byproduct of the operation. In addition, the glands of high temperature and high velocity pumps require cooling water. In the refinery this water is commonly called gland water. The gland water becomes saturated with the water-soluble phenolic compounds that inadvertently leak into such water. Cooling and waste waters from refinery operations can also become contaminated with water-soluble phenolic compounds from other sources in the refinery. These phenolic-containing waste waters present a real problem in the waste water disposal of a refinery which is either located on inland waters where such waters are used for recreational or drinking purposes or where they are located on inland bays or river outlets which are used for recreation or where oysters and other fish foods are grown for commercial purposes and thus protected by fish and game laws.

One of the methods which can be used to remove the phenols from waste water is by chemical reaction. However, this is expensive and essentially prohibitive on a very large scale. One refinery uses the high phenolic water in the crude desalting operation. During this operation the crude will absorb up to about 90% of the phenolic compounds. However the amount of phenolic compounds still remaining in the crude desalter effluent water is substantially higher than is permissible to discharge into the effluent waste water stream from the refinery. Phenolic compounds are particularly objectionable in drinking water, as well as in waters containing oysters, clams and other fishes, since relatively small amounts will yield disagreeable odors and taste.

I have discovered that if the high phenolic-containing waste water from refinery operations is used as the cooling water to cool a hot bed of coke contained in the coking drum of a delayed coking unit, the phenolic compounds will be removed by some manner when in contact with the coke so as to reduce their amount in the waste water sufficient to enable the waste water to be discharged directly to the refinery effluent or require a very small amount of treatment before such discharge. Thus a dual purpose is served. Since fresh water is normally used for cooling the hot coke bed in the coking operation, fresh water is conserved at refineries which are located in areas where fresh water supply is limited. Fresh water supply in industrial areas is recognized as a real problem of industry today. All means of conserving such fresh water by employing usable contaminated water from refinery operations must be observed. My invention is one of the steps toward a solution to this problem.

In the operation of coking crude oil and, more particularly, a process of delaying coking, a reduced crude feed stock is rapidly heated in a flowing stream by way of a pipe still. The heated stream from the pipe still is charged to a coking drum. The feed stock in the coking drum deposits a residual coke material in the drum and gasoline and gas-oil are withdrawn from the drum and passed to a fractionator. It is the usual practice to recycle a portion of the gas-oil product from the fractionator and contact the coke drum vapors with this reduced crude feed. The delayed coking process is, therefore, a combination of a distillation process and a thermal cracking process. When a coking drum becomes filled with coke, the general practice is to divert the feed stream of hot hydrocarbons to an adjoining empty coking drum which is preferably preheated. Coke is then removed from the first drum. The process of removing the coke from the first drum requires that the drum be cooled and the coke removed by mechanical or hydraulic means.

It is the general practice to utilize water to lower the temperature of the coke and coking drum prior to removing the coke therefrom. The water utilized to cool the coking drum initially vaporizes along with oil vapors and is passed to a blowdown drum. The blowdown drum may also receive steam from exhaust pumps and other utilities in the coking operation. After the bed of coke in the coking drum has cooled to below 212° F., the cooling water no longer vaporizes and the interstices become filled with water. This water is then withdrawn from the coking drum and can be reused in either the cooling step or the subsequent hydraulic cutting step. I have found that if water containing phenolic compounds in the amount of about 100 parts per million is used in the above cooling step, the phenolic content of the water is reduced to below about 10 parts per million when the water is withdrawn from the cooled coke bed.

It is therefore an object of this invention to provide a novel method of removing phenolic compounds from the waste water of refinery operations while simultaneously conserving the fresh water supply of the refinery. Additional objects will be apparent from the following description which is read in connection with the annexed drawing. The drawing shows a partial view of the delayed coking operation. After coking drum 11 is filled with coke by means not shown during the coking cycle of the delayed coking operation, the temperature of the coke is in the order of about 900° F. and must be cooled to a temperature of less than 212° F. in order that the hydraulic decoking operation may proceed. The cooling cycle is initiated by introduction of water through line 12, through open valve 13 into coking drum 11. The water introduced through line 12 is withdrawn from clear water tank 14 by pump 15. During the introduction of the water, valve 16 is closed and valve 17 is opened. As long as the temperature of the coke bed is above about 212° F., water vapors along with some oil vapors are taken overhead through line 18 to a blowdown drum, not shown. While the water from tank 14 is being introduced during the cooling step, water containing phenolic compounds is introduced through line 19 by opening valve 20. It is to be understood that the exact nature of the phenolic compounds contained in the waste water from the refinery operations is not known. Normally they are predominantly phenol, although other oxygenated compounds may be present. For the purposes of this description, whenever phenol is referred to it includes the other phenolic type compounds that may be present. When the coke has reached the temperature of less than 212° F., water is continued to be introduced until the coking drum is filled with coke and water. Valves 20 and 13 are closed and valve 16 is opened and the water contained in the coking drum is withdrawn to clear water tank 14. This water is very low in phenolic content and can be used in a subsequent coke cooling cycle, in a hydraulic decoking cycle or any excess in tank 14 may be withdrawn for disposal through line 21 by means of valve 22. In the event that the vaporization of water and subsequent withdrawal to blowdown drum during the cooling cycle is greater than the amount of phenol-containing water introduced through line 19, fresh water may be added to tank 14 through line 23 by means of valve 24. Thus it can be seen that the described operation not only conserves fresh water but permits waste water to be disposed of without harming the fish or drinking water qualities of the body of water to which it is added.

In the operation of a refinery on an east coast inland bay which contained oysters, clams and fishes protected by fish and game laws, a waste water containing from 300 to 400 parts per million of phenolic compounds was withdrawn from a fluid catalytic cracking unit. This water was subsequently used as crude desalter wash water. The desalting operation reduced the phenolic content of the water to around 50 to 80 parts per million. At this concentration the water could not be introduced directly or along with the refinery effluent to the inland bay since the concentration of phenol was higher than permitted by law. By using this water containing 50 to 80 parts per million of phenol as the cooling water in the cooling cycle of a delayed coking operation, the phenol content was reduced to less than 10 parts per million. When water containing this concentration of phenol was added to the refinery effluent, the resultant concentration of phenol in the effluent was substantially below the upper limit permitted by law.

It will be understood that numerous modifications and variations in the system outlined above can be carried out without departing from the spirit of this invention which is set forth in the appended claims.

I claim:
1. A process of reducing the amount of soluble phenolic compounds in refinery effluent waste waters to an amount below about 10 parts per million, which process comprises introducing an effluent waste water containing about 100 parts per million of phenolic compounds into a hot bed of coke in a coking drum of a delayed coking unit, cooling said coke with said waste water, withdrawing said waste water from the cooled bed of coke to recover a waste water containing below about 10 parts per million of phenolic compounds.

2. The process of claim 1 wherein the phenolic compound is phenol and the hot bed of coke is cooled to below 212° F.

3. The process of claim 1 wherein the recovered waste water is used in subsequent cooling and decoking cycles of the delayed coking operation.

References Cited by the Examiner

UNITED STATES PATENTS

| | | | |
|---|---|---|---|
| 2,076,847 | 4/1937 | Johnston | 208—48 |
| 2,254,745 | 9/1941 | Jannek | 210—40 |
| 2,671,741 | 3/1954 | Duvall | 208—48 |
| 2,758,968 | 8/1956 | Williams et al. | 210—40 |
| 2,937,142 | 5/1960 | Rios | 210—40 |

OTHER REFERENCES

Sachanen: Conversion of Petroleum, second ed., 1948, pages 249 and 250, pub. Reinhold Pub. Corp., New York, New York.

DELBERT E. GANTZ, *Primary Examiner.*

ALPHONSO D. SULLIVAN, *Examiner.*

H. LEVINE, *Assistant Examiner.*